United States Patent Office 3,763,295
Patented Oct. 2, 1973

3,763,295
USE OF ALUMINA AS A SINTERING AID IN MANUFACTURE OF HOT PRESSED BERYLLIA
Jacob Greenspan, Newton, Mass., assignor to the United States of America as represented by the Secretary of the Army
No Drawing. Filed Apr. 5, 1971, Ser. No. 131,442
Int. Cl. C04b 35/08, 35/10
U.S. Cl. 264—65                              1 Claim

ABSTRACT OF THE DISCLOSURE

A method for the fabrication of high strength beryllia-alumina alloys comprising the steps of preparing a raw powder mix of beryllium oxide containing 5 to 20% aluminum oxide by weight, die-ram pressing in a partial vacuum at a temperature of about 1400° C. under a pressure of about 4000 p.s.i. A sintering aid mixture of alumina, magnesia and silica is also disclosed.

---

The invention described herein may be manufactured, used, and licensed by or for the Government for governmental purposes without the payment to me of any royalty thereon.

This invention relates to a process for the attainment of sintered bodies of high strength beryllium oxide materials having fine grain size and low porosity.

It is generally recognized that the strength of brittle materials, e.g., beryllium oxide, which are consolidated by powder sintering methods, increases with decreasing grain size and porosity. In actual practice however, the sintering parameters essential to achieve full densification or consolidation of the powder particles, such as sintering temperatures, period of time at specific temperatures, pressures, etc., usually are conducive to grain growth, so that it is difficult to achieve microstructures in which grain size is very small and at the same time free of porosity.

It is also generally recognized that the effective or "engineering" elastic modulus of sintered bodies is influenced by the presence of porosity so that the measured elastic modulus of porous bodies is less than that of a nonporous body.

The present invention relates to a method for consolidating powders of beryllium oxide, blended with minor amounts of powders of aluminum oxide, by pressure sintering so that by proper selection of sintering temperatures in conjunction with a sufficient amount of aluminum oxide, a sintered material of low porosity, fine grain size and relatively high mechanical strength is obtained.

The present invention utilizes a discrete temperature, i.e., about 1400° C., for the chemical combination of the input powder constituents, i.e., beryllium oxide and aluminum oxide, to form $BeAl_2O_4$. Two distinct processes are involved. The first involves the chemical combination of BeO and $Al_2O_3$ to form $BeAl_2O_4$. The second process involves the sintering or consolidation of powder particles to an integral mass by interatomic diffusion. The expression "combination sintering" is utilized herein to connote the simultaneous occurrence of the above stated processes.

In accordance with the practice of the present invention, the component powders are first blended so that the raw powder mix approximates a random distribution of the $Al_2O_3$ particles within a matrix of BeO particles. The powdered mass is then subjected to sintering temperatures and pressures. The resulting microstructure consists of two separately identifiable crystallographic phases, i.e., $BeAl_2O_4$, known as chrysoberyl, and BeO. The $BeAl_2O_4$ is dispersed in a matrix of BeO.

The amount of constituent $Al_2O_3$ utilized in combination with BeO is critical in that its chemical combination with the BeO constituent as associated with "combination sintering" as previously described, must be sufficiently extensive or continuous throughout the entire powder mass to effect the substantial densification of the entire powder mass. It should be appreciated, however, that this specific minimum content of the $Al_2O_3$ powder constituent should also depend upon the size of the $Al_2O_3$ powder particles, since the finer this particle size, the more extensive is its distribution throughout the expanse of the BeO powder particle mass.

In addition, the temperature utilized in the present sintering process is critical. The temperature must be sufficient to achieve substantial densification of the powder. However, it must be minimal in order to restrict growth to obtain a fine grain size.

It is an object of this invention to provide and disclose improved sintered bodies of BeO base materials.

It is a further object of this invention to provide and disclose a method for the production of improved sintered bodies of BeO base materials.

It is a further object of this invention to provide and disclose a method for the production of a BeO base material of significantly low porosity.

It is a further object of this invention to provide and disclose a method for the production of a BeO base material having a fine grain size.

It is a further object of this invention to provide and disclose a method for the production of a BeO base material having high strength.

Other objects and a fuller understanding of the invention may be ascertained from the following description and claim.

In the preparation of the materials, beryllium oxide and aluminum oxide powders, having an average particle size of the order of about 10–15 and 0.1–0.3 microns, respectively, were blended together by mechanical tumbling in a rotary mill for a period of around 12 to 24 hours. The powders were then loaded into a graphite die and positioned in a vacuum furnace equipped for die-ram pressing at elevated temperature. The powder mass was then heated to the desired consolidation temperature while under ram pressure of 4000 p.s.i. When the desired temperature is reached, the compressibility of the powder mass increases greatly, and it is subsequently compressed until ram movement is no longer possible at ram pressure of 4000 p.s.i. The associated time interval for this total compression is of the order of 15 to 30 minutes for a sample size of about 6" diameter by ½" thick. Samples of this size were analyzed for phase structure, density, porosity, grain size, flexural strength and elastic modulus.

Set forth in the table below are examples of BeO base fabrications illustrating the present methods.

TABLE

| Example | 1 | 2 | 3 | 4 | 5 | 6 | 7 | 8 | 9 |
|---|---|---|---|---|---|---|---|---|---|
| $Al_2O_3$ (percent by weight) | 5 | 7 | 12 | 20 | 3 | 7 | 7 | 0 | 0 |
| Temperature (° C.) | 1,400 | 1,400 | 1,400 | 1,400 | 1,400 | 1,370 | 1,500 | 1,850 | 1,750 |
| Chemical combination | Yes | Yes | Yes | Yes | No | No | Yes | | |
| $BeAl_2O_4$ content (percent volume) | 5.04 | 7.2 | 12.3 | 20.9 | 0 | 0 | 7.09 | | |
| Density, gm./cm.³: | | | | | | | | | |
|   Actual | 3.030 | 3.057 | 3.078 | 3.143 | 2.280 | 2.160 | 3.050 | 2.980 | 2.880 |
|   Theoretical g.-g. | 3.052 | 3.064 | 3.102 | 3.167 | 3.030 | 3.070 | 3.064 | 3.010 | 3.010 |
| Porosity (volume percent) | 0.3 | | | 0.7 | 32.1 | 42.2 | 0.4 | 1.02 | 4.5 |
| Grain size (microns) | 1–2 | 1–2 | 1–2 | 1–2 | | | 40–80 | 35–50 | 20–30 |
| Flexural strength (thousands of p.s.i.) | 46.2 | 47.0 | 54.0 | 49.0 | 9 | | 20.3 | 32.1 | 25.5 |
| Elastic modulus (millions of p.s.i.) | 55.5 | 56.0 | 56.4 | 57.0 | | | 55.5 | | 45.8 |

Examples 1–4 satisfy the objects of this invention as required for strength, grain size, porosity and elastic modulus of the sintered compact. Thus, it is seen that flexural strength reaches the level of about 50 thousand p.s.i., that grain size is restricted to the order of 1 to 2 microns, that porosity is reduced to less than 1% and that elastic modulus is of the order of 56 to 57 million p.s.i., which is equivalent to that of full density BeO. It is seen that these properties ensue when consolidated temperature is of around 1400° C. and the aluminum oxide content is within the range of 5 to 20% by weight.

Example 5 illustrates lack of "combination sintering" attributable to insufficient aluminum oxide content. Thus, it is seen that when the aluminum oxide content is 3% that neither chemical combination of $Al_2O_3$ wlith BeO nor densification of the powder mass occurs.

Example 6 illustrates lack of "combination sintering" attributable to insufficient consolidation temperature. Thus, it is seen that when a consolidation temperature of 1370° C. is employed that neither chemical combination of $Al_2O_3$, nor densification of the powder mass occurs. Example 7 illustrates detrimental effects resulting from the utilization of excessive temperature for "combination sintering." Thus, it is seen that when a consolidation temperature of 1500° C. is employed, that while "combination sintering" does occur, the grain size is of the order of 1–2 microns as obtained in Examples 1–4. Furthermore, the strength of the material is approximately 20 thousand p.s.i., as compared with 50 thousand p.s.i.

Example 8 illustrates that BeO powders require higher sintering temperatures than do the powder blends of Examples 1–4. Furthermore, the grain sizes of the resultant product is larger and the strength significantly less than the materials of Examples 1–4.

Example 9 illustrates typical properties of a common beryllium oxide body composed of 98% BeO with 2% addition of "sintering aids" composed of a mixture of $Al_2O_3$, MgO and $SiO_2$. The resultant mixture was cold compacted and pressureless sintered at a temperature of about 1750° C. for a period of about 4 hours. A material having a grain size of about 20–30 microns, about 4.5% porosity, about 25 thousand strength and 45.8 million p.s.i. elastic modulus was obtained.

Although I have described my invention with a certain degree of particularity, I wish it to be understood that I do not desire it to be limited to the exact details of formulation shown and described for obvious modifications will occur to a person skilled in the art.

Having described my invention, I claim:

1. A method for the consolidation of a mixture of ceramic powders of BeO and $Al_2O_3$ comprising the steps of:
   (a) selecting BeO and $Al_2O_3$ having a particle size of about 10–15 and 0.1–0.3 micron, respectively,
   (b) blending to form a mixture consisting of 80–95% by weight BeO, 5–20% by weight $Al_2O_3$,
   (c) heating to a temperature of about 1400° C. under a pressure of about 4000 p.s.i., and recovering the product.

References Cited
UNITED STATES PATENTS

| | | | |
|---|---|---|---|
| 3,067,048 | 12/1962 | Gion | 106—55 |
| 3,141,782 | 7/1964 | Livey et al. | 264—125 |
| 3,165,417 | 1/1965 | Turner, Jr. | 106—55 |
| 3,205,080 | 9/1965 | Ryshkewitch | 264—56 |
| 3,341,425 | 9/1967 | Chu | 106—55 |
| 3,529,046 | 9/1970 | Hendricks, Jr. | 106—55 |
| 3,564,086 | 2/1971 | Nishigaki et al. | 264—332 |

OTHER REFERENCES

Ceramic Abstracts—1967 at 258(f–h), 1968 at 134(b), and 1969 at 374(d).

E. C. Duderstadt et al.: "Sintering BeO to Variable Densities and Grain Sizes," November 1965, Ceramic Bulletin, at 907–911.

R. B. Adams et al.: "Effect of Adsorbed Sulfate and Fluoride on Density of Hot-Pressed BeO," December 1967, Jour. of The Amer. Cer. Soc., at 685.

L. H. Sjodahl et al.: "Solute-Induced Grain Boundary Hardening and Sintering of BeO," September 1965, Jour. of The Amer. Cer. Soc., at 478–480.

A. M. Alper, Hight Temperature Oxides, part III, 1970, Academic Press, New York, pp. 15–20 and 28.

E. J. Felten: "Sintering Behavior of Beryllium Oxide," June 1961, Jour. of The Amer. Cer. Soc., at 251–255.

JOHN H. MILLER, Assistant Examiner

U.S. Cl. X.R.

106—55, 65; 264—332